Aug. 18, 1942.  E. A. TUBBS  2,293,227

ELECTRICAL MEASURING

Filed Feb. 13, 1941

INVENTOR
ERNEST A. TUBBS
BY
ATTORNEY

Patented Aug. 18, 1942

2,293,227

UNITED STATES PATENT OFFICE 2,293,227

ELECTRICAL MEASURING

Ernest A. Tubbs, Long Island City, N. Y., assignor to Ferris Instrument Corporation, Boonton, N. J., a corporation of New Jersey Application February 13, 1941, Serial No. 378,767

6 Claims. (Cl. 171—95)

Though my present invention broadly relates to measuring electrical effects, it is my present belief that it can best be practiced by measuring such effects with their actual or indicated potential values as bases.

A particular object of my present invention is to measure an electrical effect or electrical effects at a point remote from the point or points at which the electrical effect or effects involved occurs or occur. A further particular object is the adaptation of my present invention to measuring an electrical effect or effects that suffers or suffer attenuation by reason of unavoidable and cumulative transmission losses.

Experiences in electrical fields have demonstrated that there are many cases of uses of electrical effects after transmission even over short distances by usual transmission means to a point or points remote from a source of transmission in which it would be of substantial advantage to be able to determine at the point of origin, or at some point short of the remote point or points, the resulting residual working value or values of the electrical effect or effects reaching said remote point or points.

One outstanding example of the advantage and importance of the above mentioned accomplishment is the one arising out of the universal practice of measuring or determining the response characteristics of radio receivers designed to be responsive at any one frequency over a wide range of frequencies by applying output electrical effects of a so-called standard signal generator to the input terminals of a radio receiver under response investigation through a flexible and conductive cable, or its equivalent, usually attached to, and forming a part of the make-up of, a standard signal generator, with respect to which practice I refer to U. S. Patents 1,793,601 of February 24, 1931; 1,877,287 of September 13, 1932; 2,037,160 of April 14, 1936; 2,131,101 of September 27, 1938; and 2,265,637 of December 9, 1941, all granted to Malcolm Ferris.

Figure 1:
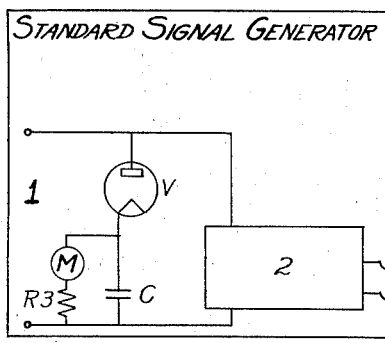
Figure 2:
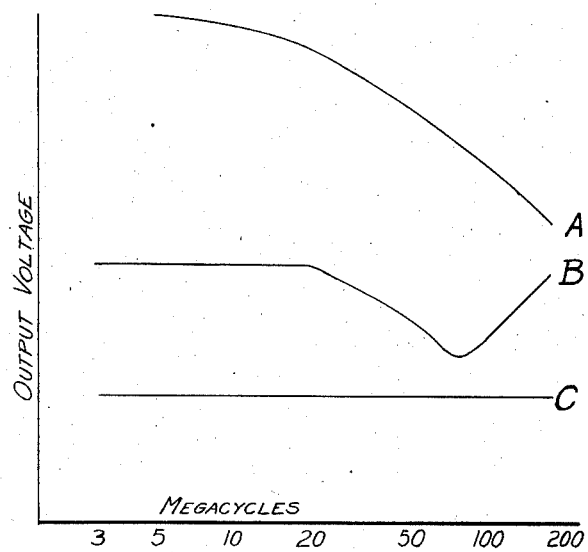

My present invention will be best understood by reference to the figures of the accompanying drawing, in which Fig. 1 schematically illustrates standard means for investigating the characteristics of devices, such as radio receivers, here shown merely for explanatory purposes in connection with hereinafter defining my herein involved invention; Fig. 2 contains curves illustrative and explanatory of the results obtained by practicing my present invention; and Fig. 3 schematically illustrates a manner in which my present invention may be embodied in the arrangement of Fig. 1 to bring about beneficial results not obtainable without the application thereto of means included in my present invention.

In Fig. 1, the element 1 represents a standard signal generator usually including therein as element 2 a so-called attenuator, usually comprising a net-work of resistances and switching means by which the electrical effects generated and supplied by the signal generator 1 may be varied in values to predetermined extents before being injected into a transmission cable 3, or its equivalent, usually terminated by a cross-connected resistance 4 having a value substantially equal to the characteristic impedance of the cable it terminates, and across which resistance the input terminals of any device under investigation are usually connected. The meter M, usually an element of a so-called vacuum tube voltmeter including a rectifier tube V, is usually connected across the input elements of the attenuator 2 to register values of the potentials of the electrical effects supplied to the attenuator 2 by the signal generator 1.

Thus, the user of the above described arrangement has as information on which to arrive at the working value or values of the electrical effect or effects thus applied to the device under the investigation the reading or readings of the meter V corrected to make due allowance for the setting of the attenuator switching means; and that this information is not sufficient for arriving at any approach to the true working value or values of the electrical effect or effects thus applied to the device under investigation is obvious from the fact that due to the distributed losses in the cable the attenuation between the input to the cable and the device under investigation does not remain constant with changes of frequency necessary to investigate the response characteristics of devices under investigation over the wide range of frequencies commonly involved. Curve A of Fig. 2 is a typical graphic showing of how the working values of the electrical effects which reach the device under investigation vary with change of frequency of the applied to the cable electrical effects while maintaining the working values thereof substantially constant, this through a range of 5 to 175 megacycles.

Figure 3:
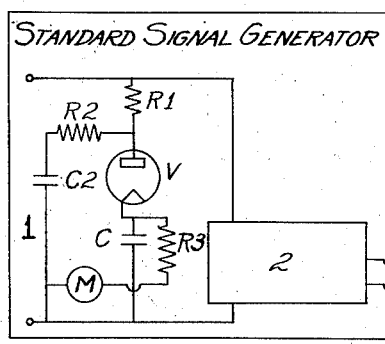

Fig. 3 schematically illustrates manners in which my present invention may be adapted to the arrangement of Fig. 1 with resulting benefits and practical advantages. As in Fig. 1, the element 1 represents a source of electrical effects, such as a standard signal generator; the element 2, as in Fig. 1, represents the presence of an attenuator, or its equivalent; the element 3, as in Fig. 1, represents a cable, such as a coaxial cable, or its equivalent; and the element 4, as in Fig. 1, represents a usual terminating impedance, preferably having a value substantially equal to the characteristic impedance of the said cable, or its equivalent. As a first difference from Fig. 1, there is shown by Fig. 3 a resistance R1 in series with the vacuum tube V of the vacuum tube voltmeter.

With Fig. 1 modified to the above stated extent, it is obvious that as the frequency of the applied electrical effect is increased while other conditions remain unchanged, the meter M will progressively read lower; but if the output of the signal generator is increased so as to maintain the reading of the meter M substantially constant, the working values of potential developed across terminating impedance 4 vary in accordance with curve B of Fig. 2 provided a suitable value for resistance R1 is chosen, which, in spite of its bad dip in the region of 80 megacycles shown thereby, obviously represents a substantial improvement in resulting approach towards maintaining constancy of working values of potential applied to the device under investigation with change of frequency over what is shown by curve A as a result of operating with the unmodified arrangement of Fig. 1.

By further including as additional elements over those shown by Fig. 1 a resistance R2 in series with a condenser C2 of selected values, and connected up in the manner shown with respect to tube V, I have found that the bad dip of curve B can be substantially eliminated to arrive at a substantially constant working value potential of the electrical effects now developed across impedance 4 as shown by curve C of Fig. 2, provided the standard signal generator and/or attenuator is or are so operated as to maintain the reading of meter M substantially constant.

The overall result shown by curve C of Fig. 2 was obtained while using a Ferris Instrument Corporation model 18-C standard signal generator (fully described in the above mentioned Ferris Patent 2,265,637) as element 1 (which embodies an attenuator 2 plus a vacuum tube voltmeter comprising elements V, R3, C and M), a coaxial cable 3 feet in length having a characteristic impedance of 30 ohms as element 3, a 30 ohm terminating resistance as element 4, a 140 ohm resistance as element R1, a 500 ohm resistance as element R2, and a so-called trimmer condenser variable in its capacity values from 2 to 5 micromicrofarads.

The following is given merely as an explanatory example of a procedure to follow in making practical use of the next above described arrangement: Assuming that the device to be investigated is a radio receiver designed to cover or include some portion of the frequency range from 3 to 180 megacycles shown by Fig. 2, first connect the extremities of terminating resistance 4 to the input terminals of the device; second, adjust the signal generator to generate alternating current of a frequency within the range covered by the device, and tune the device to resonate thereto; third, vary the intensity of the signal generator output until a satisfactory response by the device is obtained; fourth, read the resulting reading of the meter and setting of the attenuator; and fifth, etc., repeat the foregoing procedure at such frequencies of the device as may appear to be necessary to satisfactorily determine its response characteristics in different parts of the frequency band the device is designed to cover.

From the foregoing, it is obvious that I provide for observing the responses in at least all of the 17,700 of the usual 10 kilocycle bands contained in the total band of 3 to 180 megacycles mentioned while remaining at one setting of the vacuum tube voltmeter V.

While I have described my invention in certain confined respects, it is apparent that modifications may be made and that no limitations are intended other than those imposed by the scope of the appended claims.

What I claim as new and desire to secure by Letters Patent of the United States is as follows:

1. In an electrical transmission system, the combination of a transmission cable terminated at one end by an impedance substantially equal in value to the characteristic impedance of said cable, means for generating and supplying electrical alternating current of any one frequency of a band of frequencies to the other end of said cable, and means for measuring the resulting potentials developed across said terminating impedance comprising a vacuum tube voltmeter connected across the output of said generating means in operative association with resistive and capacitive means of such values and so arranged as to automatically cause said meter to read lower than the output potential of said generating means by an amount substantially equal to the potential reduction in said cable due to cumulative attenuation losses therein as the frequency of said alternating current is increased, whereby all of the necessary measurements may be made at one setting of said vacuum tube voltmeter.

2. In an electrical transmission system, the combination of a transmission cable terminated at one end by a resistance substantially equal in value to the characteristic impedance of said cable, means for generating and supplying electrical alternating current of any one frequency of a band of frequencies to the other end of said cable, and means for measuring the resulting potentials developed across said terminating resistance comprising a vacuum tube voltmeter connected across the output of said generating means in operative association with resistive and capacitive means of such values and so arranged as to cause said meter to automatically read lower than the output potential of said generating means by an amount substantially equal to the potential reduction in said cable due to cumulative attenuation losses therein as the frequency of said alternating current is increased, whereby all of the necessary measurements may be made at one setting of said vacuum tube voltmeter.

3. In an electrical transmission system, the combination of a transmission cable terminated at one end by an impedance substantially equal in value to the characteristic impedance of said cable, means for generating and supplying electrical alternating current of any one frequency of a band of frequencies to the other end of said cable, and means for measuring the resulting potentials developed across said terminating impedance comprising a vacuum tube voltmeter connected across the output of said generating means in series with means for causing said meter to automatically read increasingly lower than the output potentials of said generating means as the frequency of said alternating current is increased, whereby all of the necessary measurements may be made at one setting of said vacuum tube voltmeter.

4. In an electrical transmission system, the combination of a transmission cable terminated at one end by an impedance substantially equal in value to the characteristic impedance of said cable, means for generating and supplying electrical alternating current of any one frequency of a band of frequencies to the other end of said cable, a vacuum tube voltmeter connected across the output of said generating means through a resistance in series therewith, and a resistance in series with a condenser connected in shunt relation to said voltmeter, whereby all of the necessary measurements may be made at one setting of said vacuum tube voltmeter.

5. In an electrical transmission system, the combination of a transmission cable substantially 3 feet long having a characteristic impedance substantially equal to 30 ohms terminated by an impedance substantially equal to 30 ohms, means for generating and supplying electrical alternating current of any one frequency in a band of frequencies of the order of 3 to 200 megacycles to the other end of said cable, and means for measuring the potentials developed across said terminating impedance comprising a vacuum tube voltmeter connected across the output of said generating means through a resistance substantially equal to 140 ohms, whereby all of the necessary measurements may be made at one setting of said vacuum tube voltmeter.

6. The system of claim 5 in which a circuit having a resistance substantially equal to 500 ohms in series with a condenser having a range of capacity variation of from substantially 2 to 15 micromicrofarads is connected in shunt relation to the vacuum tube voltmeter, whereby all of the necessary measurements may be made at one setting of said vacuum tube voltmeter.

ERNEST A. TUBBS.